O. T. FARNHAM.
LIQUID MEASURING AND TRANSFERRING TUBE.
APPLICATION FILED NOV. 13, 1907.

898,456.

Patented Sept. 15, 1908.

Witnesses
John F. Cavanagh
E. D. Ogden

Inventor
Ormsbee T. Farnham
By
Howard E. Barlow.
Attorney

UNITED STATES PATENT OFFICE.

ORMSBEE T. FARNHAM, OF EAST GREENWICH, RHODE ISLAND.

LIQUID MEASURING AND TRANSFERRING TUBE.

No. 898,456.　　　　　Specification of Letters Patent.　　　Patented Sept. 15, 1908.

Application filed November 13, 1907. Serial No. 401,972.

*To all whom it may concern:*

Be it known that I, ORMSBEE T. FARNHAM, a citizen of the United States, residing at the town of East Greenwich, in the county of Kent and State of Rhode Island, have invented certain new and useful Improvements in Liquid Measuring and Transferring Tubes, of which the following is a specification, reference being had therein to the accompanying drawing.

This invention relates to liquid gages and has for its object to provide an extremely simple, neat and effective instrument for picking up, accurately measuring, and readily depositing small quantities of liquid.

An essential feature of this unique instrument is its particular adaptability for measuring medicines in drops, or portions of a teaspoonful.

It is well known that to pour medicine from a bottle into a spoon to obtain doses of exactly so many drops requires great care and considerable skill, and is a very uncertain method of measuring at the best. To completely obviate this difficulty and accomplish this measuring in a simple and effective manner I have provided a glass tube adapted to enter the bottle and extend down into the liquid and pick up the exact amount required. This glass tube may be graduated to indicate a number of drops, drams, teaspoonfuls, or any other convenient unit of measure.

For measuring medicine the tube is preferably graduated and numbered at one end to indicate drops. When a specific number of drops is required the tube is inserted into the liquid in the bottle to the depth denoted by the numeral on the gage. The finger of the hand is then placed over the opposite end of the tube thereby sealing the same and preventing the liquid from running out when the tube is withdrawn. The liquid may then be transferred directly to the mouth of the patient and deposited therein by simply removing the finger from the end of the tube, or when required to be diluted it may be deposited into a glass of water.

The salient features of the device when used for measuring medicine are, first, its extreme simplicity; second, accuracy in quickly obtaining the exact amount, and third, its perfectly sanitary construction.

The invention is fully set forth in this specification and more particularly pointed out in the appended claims.

Figure 1:
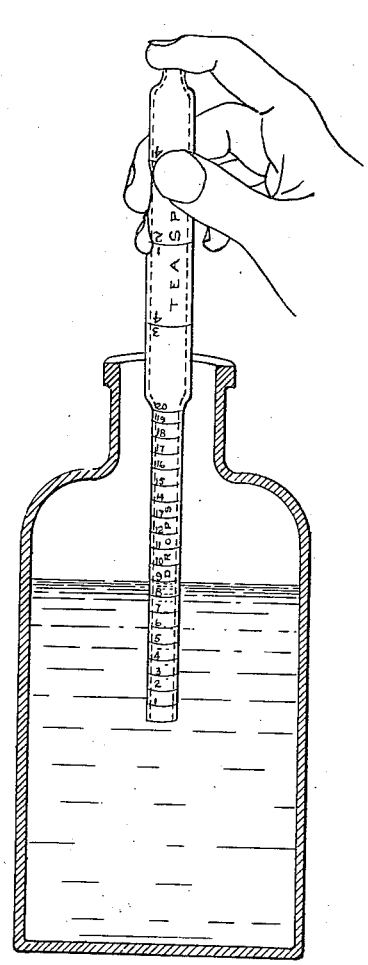
Figure 3:
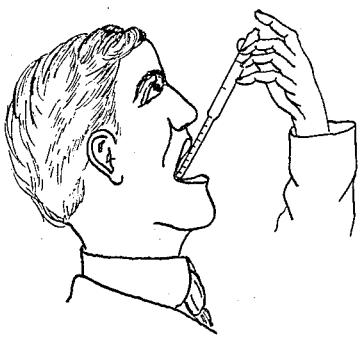
Figure 2:
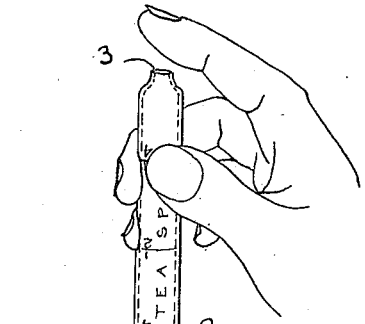
Figure 2:
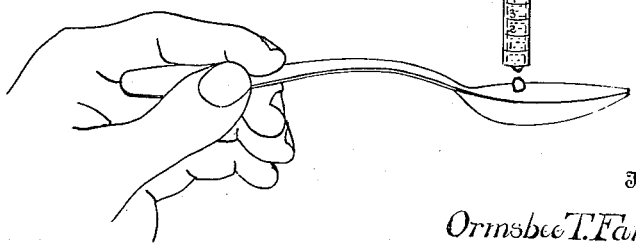

In the accompanying drawings: Figure 1— is a view of the instrument showing the same held in the hand and inserted through the neck of a bottle into the liquid therein contained, the finger of the hand being placed over the opposite end of the tube to seal the same and by taking advantage of the atmospheric pressure prevent the liquid from running out when the tube is withdrawn. Fig. 2—shows the instrument after having removed the liquid from the bottle in the act of depositing the same by simply raising the finger and breaking the seal from the opposite end of the tube. Fig. 3—illustrates the instrument as having transferred the medicine in the desired quantity direct from the bottle into the patient's mouth.

Referring to the drawings, the tube shown is transparent and preferably made of glass, and has an elongated contracted portion 1 adapted to readily pass into the neck of small bottles. This reduced portion may be graduated into drops, teaspoonfuls or any other convenient unit of measure, but for measuring medicine the instrument shown is preferably graduated to indicate drops. The opposite half of this glass tube at 2 is shown as being enlarged and adapted to hold a teaspoonful, the same being graduated into one, two, three and four quarters of the capacity of a teaspoon. The enlarged portion of this tube is preferably provided with a contracted end at 3 so that the same may be readily covered and sealed by the finger of the hand that holds the tube.

When any portion of a teaspoonful of medicine is required, instead of so many drops, the tube is changed end for end and the large portion inserted into the liquid in the bottle to the depth required as indicated by the numeral on this graduated end. The opposite or small end of the tube is then sealed by placing the finger over the same after which the tube may be withdrawn to deposit the medicine in any desired place.

Another feature of this invention is that when it is desired to take such medicines as iron, or the like, that are injurious to the teeth, the same may be carried to the back part of the mouth by the end of the tube and swallowed without coming into contact with the teeth.

Having thus described my invention, what I claim as new and desire to secure by Letters Patent, is:

An instrument of the type described composed of a glass tube divided into two sections, one of said sections being of equal diameter throughout and formed with a flat end extremity and being graduated to indicate units of a certain measure, the other section being of greater and uniform diameter throughout its major portion and being graduated to indicate units of a different measure than those of the first named section, the outer end of said second named section being contracted and having its extremity formed flat, whereby said sections may be used interchangeably and their outer extremities sealed by one of the fingers of the user.

In testimony whereof I affix my signature in presence of two witnesses.

ORMSBEE T. FARNHAM.

Witnesses:
HOWARD E. BARLOW,
E. I. OGDEN.